No. 831,396. PATENTED SEPT. 18, 1906.
W. R. WHITNEY.
PROCESS OF SEALING EVACUATED VESSELS.
APPLICATION FILED MAR. 8, 1905.
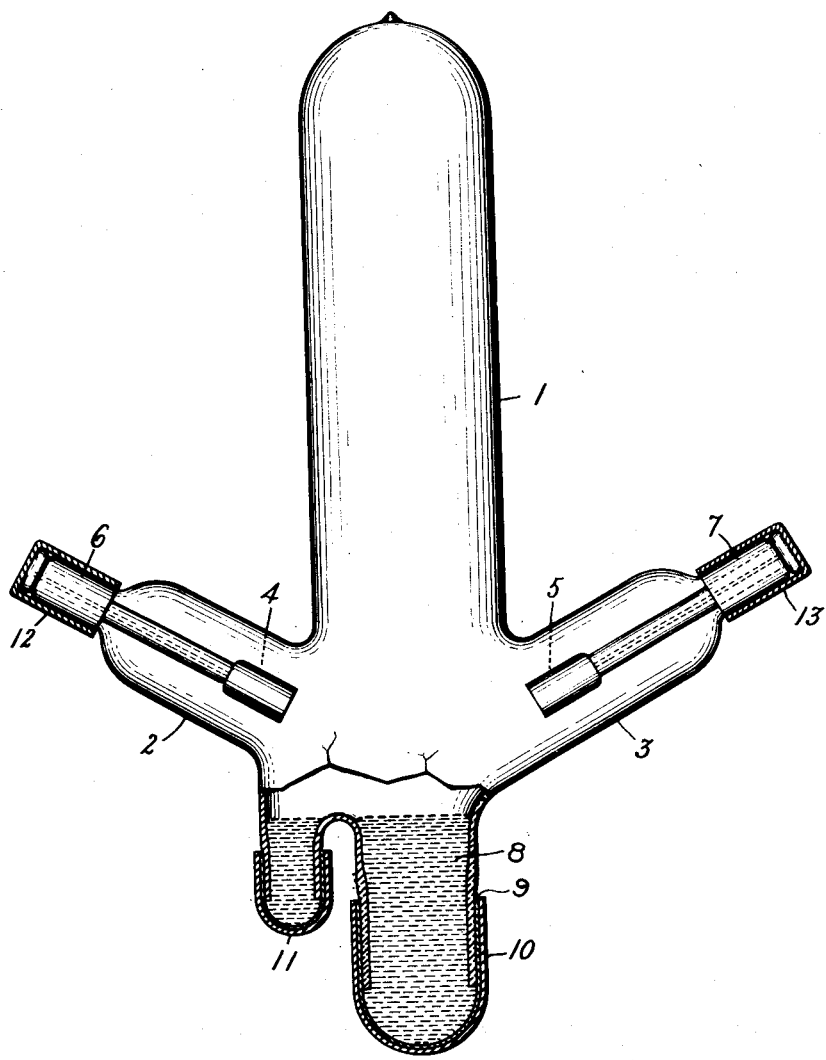
Witnesses:
George H. Tilden.
Inventor:
Willis R. Whitney,
by Albert G. Davis
Att'y.

UNITED STATES PATENT OFFICE.

WILLIS R. WHITNEY, OF ALPLAUS, NEW YORK, ASSIGNOR TO GENERAL ELECTRIC COMPANY, A CORPORATION OF NEW YORK.

PROCESS OF SEALING EVACUATED VESSELS.

No. 831,396.   Specification of Letters Patent.   Patented Sept. 18, 1906.

Application filed March 8, 1905. Serial No. 249,109.

*To all whom it may concern:*

Be it known that I, WILLIS R. WHITNEY, a citizen of the United States, residing at Alplaus, town of Glenville, county of Schenectady, State of New York, have invented certain new and useful Improvements in the Processes of Sealing Evacuated Vessels, of which the following is a specification.

In the manufacture of evacuated tubes for mercury-lamps and similar apparatus it has been found desirable to seal up one end of the tube with a metallic cup. This cup may serve not only to provide an air-tight closure for the end of the tube, but it may also serve as a support for an electrode of solid conducting material or as a containing-receptacle for an electrode of mercury. When so used, it serves to convey current to or from the space within the receptacle or tube, and thereby obviates the necessity for platinum or other leading-in wires. These metallic cups have heretofore been sealed to the fragile tubes or vessels by slipping them over the end of the tube and then heating the cup and the end of the tube until the glass or other material becomes plastic, after which the glass may be blown against the inner surface of the cup, making intimate contact therewith and an air-tight seal. In carrying out this process considerable care must be exercised in selecting a proper thickness for the metal cup, so that when the tube is allowed to cool after the heating operation the different ratios of expansion of the two materials will not cause a fracture of the glass or other fragile material. Thus if the metal cap is made too thick and rigid it has a tendency to shear off the glass tube at the upper edge of the cup or at least to set up such strains in the glass that the tube will fail at this point. On the other hand, if the metal cup is made very thin it is liable to be rendered defective by the oxidation which results from the heat applied during the sealing operation. As the usual thickness of these cups as heretofore used is about .008 to .012 inches, the corrosion of a very small quantity of the metal will greatly reduce the mechanical strength of the seal. Furthermore, although the seal may appear perfect at the time of manufacture the metallic oxid on the surface of the cup may eventually scale off, thus opening up holes through the metal or at least so reducing its strength as to finally destroy the vacuum within the tube.

It is the object of this process to protect the metal cup from oxidation during the sealing-in operation, thereby preserving the original strength of the metal cup and permitting the use of sheet metal for such cups materially thinner than has heretofore been employed.

The process consists, essentially, in protecting the metal cup with a covering of noncombustible material—such, for instance, as a second metal cup slightly larger than the first and completely surrounding the latter, this second cup being retained in place until all the heating processes have been completed, after which it may be slipped off, leaving the inner cup bright and unimpaired.

The drawing shows a mercury-rectifier with seals constructed according to the process above outlined.

In the figure, 1 is a vessel, of glass or other material, capable of being rendered ductile by heat. 2 and 3 are tubular extensions of this receptacle containing anodes 4 and 5, of carbon or other suitable material, supported from metallic cups 6 and 7, as will be readily understood by those skilled in the art. The tube is provided with a mercury-cathode 8, the mercury being in electrical contact with the metallic cup 9. This metallic cup may consist of iron, iron alloys, or other suitable metallic material. A second cup 10, preferably of the same material as the inner cup, surrounds the latter, thereby protecting it from oxidation during the heating and sealing operations. In carrying out my process these two nested cups are slipped on over the end of the tube, and the tube is subsequently heated and blown out until it makes an airtight joint with the inner cup. After this the tube may be allowed to cool and may be sealed off in the complete form, as shown in the figure. When so completed, the outer cup 10 may be removed, thereby leaving the inner cup 9 unimpaired by the heating and sealing operations. The other seals for the tube may be protected in the same manner during the process of manufacture by the auxiliary cups 11, 12, and 13.

While I have described my improved process as applied to mercury-rectifiers, it should be understood that it is equally applicable to any type of apparatus in which an air-tight seal is necessary between an oxidizable material and a material which may be rendered ductile by heat.

I am aware that it is old in the manufacture of certain forms of oil-lamps to secure a metal collar to the glass oil-well by first heating the glass and then introducing it into the metal collar and blowing it out against the metal. In such a process the metal is not heated except by radiation from the glass, so that it is at a lower temperature than the glass. The result of this is that when the joint is cooling a greater contraction occurs in the glass than in the metal, and the glass tends to separate slightly from the inner surface of the collar. Such a phenomenon is not disadvantageous in connection with oil-lamps, as the collar may be protected from displacement by annular flutings or threads. On the other hand, such a process is entirely inapplicable to mercury-vapor lamps, as the slightest leak around the seal would eventually destroy the vacuum and ruin the lamp. The process forming the subject of this application differs essentially from that just described in several particulars, one of which is that in carrying out my process both the glass and the metal cup are heated to substantially the same temperature during the sealing operation, so that both are considerably expanded. Then when the joint cools the higher coefficient of expansion of the metal causes the metal cup to contract more rapidly than the glass, thereby causing the metal to firmly grip the tube. As previously stated, if the metal cup is too thick this powerful contraction will fracture the glass at the upper edge of the cup; but if, on the other hand, the cup is made of the dimensions described in this application the cup will stretch sufficiently to prevent such destructive action. The thinner the metal cup can be made the less liability there is for destruction of the glass tube from this cause, so that by protecting the sealing-cup with a heat-resisting covering, as herein described, a greatly-improved article of manufacture can be produced.

What I claim as new, and desire to secure by Letters Patent of the United States, is—

1. The process of sealing frangible vessels with a metallic closure, which consists in heating said closure and a part of said vessel to a temperature at which the material of said vessel is plastic, and forcing said plastic material into intimate contact with said metallic closure and simultaneously protecting said metallic closure from oxidation with a non-combustible covering.

2. The process of sealing frangible vessels with an oxidizable closure, which consists in heating said closure and a part of said vessel to a temperature at which the material of said vessel is plastic, and forcing said plastic material into intimate contact with said closure and simultaneously protecting said closure from oxidation with a removable metal covering.

3. The process of sealing a frangible tube with a metallic cup which consists in heating a part of said tube to a temperature at which it becomes plastic, forcing said plastic material against the wall of said cup, simultaneously protecting said cup from oxidation with a removable covering, and subsequently removing said covering.

4. The process of closing a tubular vessel with a metal cup, which consists in mounting a plurality of nested cups on one end of said tubular vessel, heating said end to a plastic condition and forcing it into intimate contact with the inner of said cups, and subsequently removing the outer cup.

5. The process of sealing fragile vessels with metallic closures which consists in simultaneously heating said closure and a part of said vessel to a temperature at which the material of said vessel is plastic, forcing said plastic material into intimate contact with one side of said metallic closure, and simultaneously protecting the other side of said metallic closure from oxidation.

In witness whereof I have hereunto set my hand this 6th day of March, 1905.

WILLIS R. WHITNEY.

Witnesses:
BENJAMIN B. HULL,
HELEN ORFORD.